US00RE36944E

United States Patent [19]

Li

[11] E Patent Number: Re. 36,944

[45] Reissued Date of Patent: Nov. 7, 2000

[54] OPTICAL FIBER BASED BISTATIC RADAR

[76] Inventor: Ming-Chiang Li, 11415 Bayard Dr., Mitchellville, Md. 20721

[21] Appl. No.: 08/524,211

[22] Filed: Dec. 7, 1995

Related U.S. Patent Documents

Reissue of:

[64] Patent No.: 5,296,860
Issued: Mar. 22, 1994
Appl. No.: 07/787,085
Filed: Nov. 4, 1991

[51] Int. Cl.[7] ..... G01S 7/48; G01S 13/86

[52] U.S. Cl. ..... 342/58; 342/54; 342/59; 342/125; 342/126; 342/67; 342/53; 342/55

[58] Field of Search ..... 342/52, 54, 56, 342/57, 59, 58, 53, 13, 67, 125, 126

[56] References Cited

U.S. PATENT DOCUMENTS

| | | | |
|---|---|---|---|
| H1059 | 5/1992 | Koni | 359/124 |
| 3,978,482 | 8/1976 | Williams et al. | 342/142 |
| 4,048,637 | 9/1977 | Jacomini | 342/161 |
| 4,132,988 | 1/1979 | Blacksmith et al. | 342/27 X |
| 4,168,532 | 9/1979 | Dempsey et al. | 395/275 |
| 4,354,419 | 10/1982 | Patterson | 244/3.1 X |
| 4,370,656 | 1/1983 | Frazier et al. | 342/458 |
| 4,468,766 | 8/1984 | Spezio | 370/3 |
| 4,540,978 | 9/1985 | Burns et al. | 342/28 X |
| 4,577,924 | 3/1986 | Mathis | 350/96.15 |
| 4,583,096 | 4/1986 | Bellman et al. | 342/368 |
| 4,595,924 | 6/1986 | Gehman | 342/28 |
| 4,613,863 | 9/1986 | Mitchell | 434/2 X |
| 4,688,046 | 8/1987 | Schwab | 342/456 |
| 4,691,312 | 9/1987 | Vlasak | 370/4 |
| 4,695,790 | 9/1987 | Mathis | 364/822 |
| 4,699,466 | 10/1987 | Brandstetter et al. | 350/162.12 |
| 4,726,644 | 2/1988 | Mathis | 350/96.16 |
| 4,860,216 | 8/1989 | Linsenmayer | 364/516 |
| 4,967,980 | 11/1990 | Pinson | 244/3.12 |
| 4,980,690 | 12/1990 | Fiden | 342/62 |
| 5,017,930 | 5/1991 | Stoltz et al. | 342/465 |
| 5,025,487 | 6/1991 | Eichen | 455/618 |
| 5,029,306 | 7/1991 | Bull et al. | 342/368 |
| 5,031,234 | 7/1991 | Primas et al. | 455/605 |
| 5,032,839 | 7/1991 | Even-Or | 342/15 |
| 5,035,375 | 7/1991 | Friedenthal et al. | 244/3.12 |
| 5,042,086 | 8/1991 | Cole et al. | 455/606 |
| 5,054,875 | 10/1991 | Curran | 385/27 |
| 5,095,286 | 3/1992 | Cole et al. | 330/308 |

*Primary Examiner*—John B. Sotomayor

[57] ABSTRACT

A bistatic radar system includes a transmitting radar site; a receiving radar site; and an optical fiber RF link system for transmitting RF signals from the receiving site to the transmitting site and for transmitting command and control signals from the transmitting site to the receiving site.

22 Claims, 6 Drawing Sheets

100

400

500

OPTICAL FIBER BASED BISTATIC RADAR

Matter enclosed in heavy brackets [ ] appears in the original patent but forms no part of this reissue specification; matter printed in italics indicates the additions made by reissue.

TECHNICAL FIELD OF INVENTION

The present invention relates to a radar system and, in particular, to a bistatic radar system which utilizes optical fibers to transmit received radar signals from a receiving site to a transmit site.

BACKGROUND OF THE INVENTION

Most radar systems in use today are monostatic radar systems, i.e., they are comprised of a single site to perform both a transmitting and a receiving function. Although monostatic radar systems are the most prevalent ones used, they suffer from a drawback in that unable to obtain information which will enable them to determine many important features of targets.

It is well known in the art that a bistatic radar system can overcome the above-defined drawback. However, despite this, bistatic radar has not received wide acceptance in comparison with monostatic radar for the following reasons. First, at least two sites are required for a bistatic system. This is considered to be a drawback for a bistatic system since the cost of additional sites, i.e., the cost of additional personnel, hardware, and supporting facilities, makes a bistatic radar at least twice as expensive as a monostatic radar. Second, in order to process received radar signals effectively in a bistatic system so that maximum information can be obtained, it is necessary to have reference information concerning the original transmitted radar signals. When the separation of two bistatic sites is small, the reference information may be derived from a transmitted signal which is propagated along the earth's surface from the transmitter site to the receiver site, i.e., a direct signal. However, as the separation between the bistatic sites increases, surface attenuation will reduce the strength of the direct signal and degrade its quality. Moreover, whenever there is a large separation between bistatic sites, the direct signal cannot be used to provide the reference information. Although, in an alternative method, the reference information may be obtained by utilizing a stable clock or oscillator, this method suffers in that the use of clocks or oscillators severely restricts the versatility of a bistatic radar system. Third, the volume of observation is limited to an intersection volume of the transmit antenna beam and the received antenna beam. Thus, the use of high-gain antennas by the transmitting and receiving sites leads to inefficient use of the radar power since only the volume common to both beams is used during an observation, i.e., targets outside of the common volume are lost. In order to overcome this drawback, it is known in the prior art to scan the transmitted beam with multiple, simultaneous receiving beams in order to cover a surveillance sector. The use of multiple, simultaneous receiving beams increases the cost and complexity of the bistatic radar system, since the use of multiple, simultaneous receiving beams requires dedicated antennas, receivers, and processors for each receiving beam. In order to reduce the cost of a system using multiple, simultaneous receiving beams, it is known to utilize a pulse chasing method by utilizing a single receiving beam and a single signal processor instead of the multiplicity of receivers and processors used in the multiple, simultaneous receiving beam system. In accordance with the pulse chasing method, the single receiving beam is rapidly scanned over the volume covered by the transmit beam, i.e., to chase the transmit pulse as it propagates away from the transmitting antenna. Since, mechanical beam chasing is impossible, one must use a phase array to chase the transmitted pulse and, this further complicates the problem of resolving volumetric limitation. Fourth, as is well known in the art, synchronization is required between the bistatic transmitting and receiving sites. As the transmitting antenna scans and searches, the receiving antenna must be coordinated so that it can follow and cover the designated scanning and searching volumes. As a result, a command and control link is required to provide such coordination. However, the use of such a command and control link suffers from several drawbacks. A first drawback is that the digital link entails overhead time which occurs as the result of radio frequency (RF) to digital conversion at the receiving site and in digital signal processing of the received radar signal. A second drawback occurs as a result of the need to correct any detected lack of coordination promptly. The correction incurs further overhead in time because such correction requires conversion from analog to digital at the transmitting site as well.

In light of the above, there is a need in the art for a bistatic radar system which is simple and inexpensive and which does not require processing of a received signal at a receiving site.

SUMMARY OF THE INVENTION

Embodiments of the present invention advantageously satisfy the above-identified need in the art and provide a bistatic radar system which is simple, inexpensive, and versatile; which achieves synchronization between transmitting and receiving sites; and which does not require processing of a received signal at a receiving site. In particular, an embodiment of the inventive bistatic radar system comprises a transmitting radar site; a receiving radar site; and an optical fiber RF link system for transmitting RF signals from the receiving site to the transmitting site and for transmitting command and control signals from the transmitting site to the receiving site.

In a preferred embodiment of the present invention, receiving sites are equipped only with antenna subsystems and, as a result, are passive and do not require operation personnel. Antenna subsystems at bistatic receiving sites are under the direct command and control from the transmitting site and received bistatic radar signals from receiving sites are fed by optical fiber RF link systems directly to the transmitting site for processing. Further, the received bistatic radar signals are processed in the same fashion as monostatic radar signals since no major differences exist in processing for monostatic and bistatic radar signals.

BRIEF DESCRIPTION OF THE DRAWING

A complete understanding of the present invention may be gained by considering the following detailed description in conjunction with the accompanying drawing, in which.

DETAILED DESCRIPTION

Figure 1:
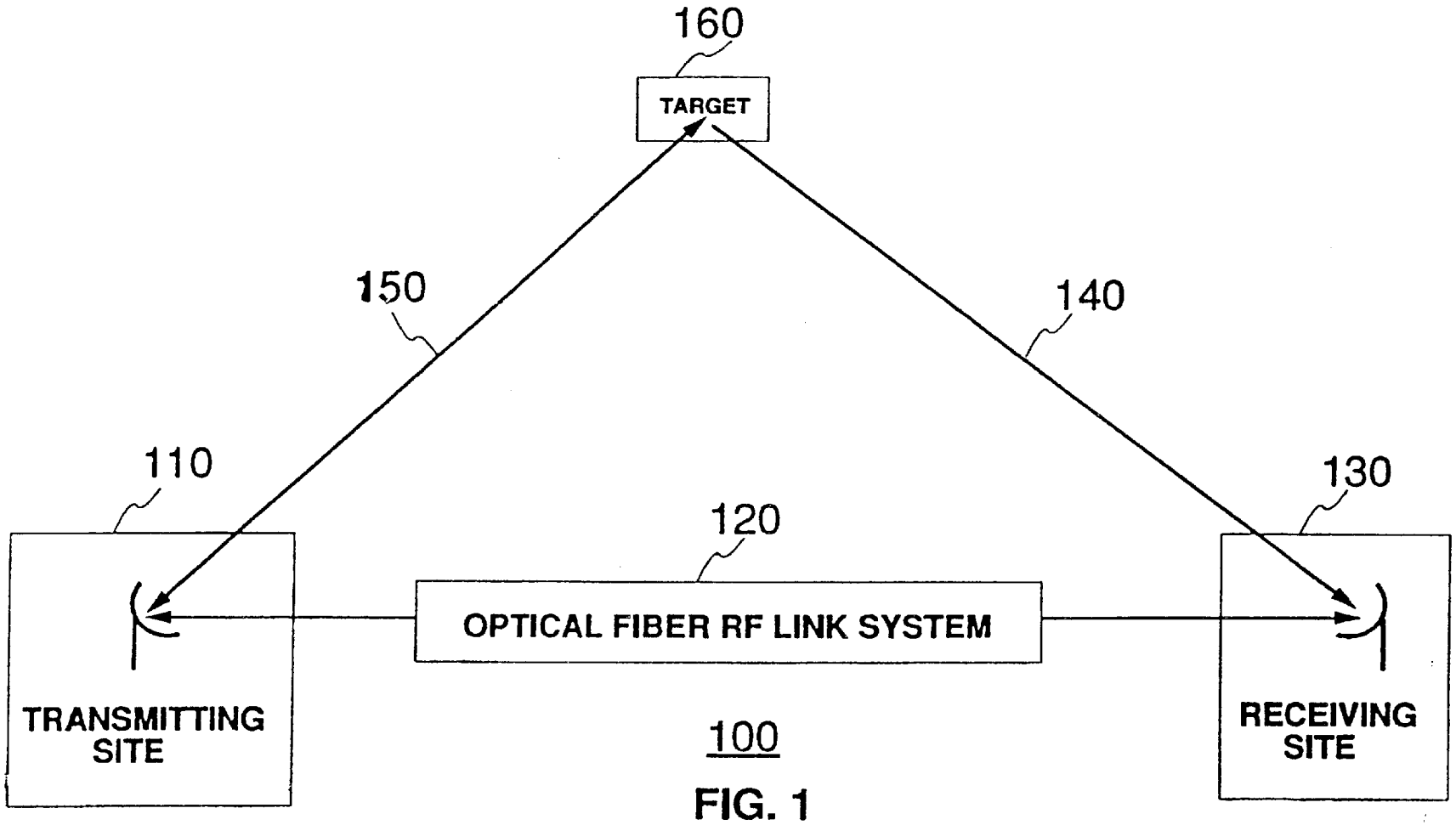
FIG. 1 shows a block diagram of an optical fiber based bistatic radar fabricated in accordance with the present invention.

FIG. 1 shows a block diagram of embodiment 100 of a bistatic radar system ("BRS") which is fabricated in accordance with the present invention. As shown in FIG. 1, BRS 100 is comprised of transmitting site 110 ("TS 110"), receiving site 130 ("RS 130"), and optical fiber RF link system 120 ("OFRLS 120"). Although FIG. 1 shows RS 130 as being a single receiving site, embodiments of the present invention include systems wherein RS 130 is comprised of a multiplicity of receiving sites.

TS 110 in FIG. 1 is much like a transmitting site which is found in an ordinary monostatic radar site. It can receive and process its own monostatic radar signals and, in accordance with the present invention, it is also equipped with receivers and processors to receive and process bistatic radar signals as well. Thus, monostatic and bistatic modes of operations are executed at TS 110. In particular, TS 110 is comprised of antenna subsystems, transmitters, receivers, processors, command and control subsystem, and supporting facilities which are well known to those of ordinary skill in the art. Since the bistatic signals are processed in TS 100, where reference signals are always available, in accordance with the present invention, there is no difference in processing monostatic and bistatic radar signals. As an advantageous result of the present invention, all known monostatic processing methods may be applied, without alteration, to process the bistatic signals.

As those of ordinary skill in the art should readily appreciate, for the sake of convenience and safety, receivers, processors, command and control subsystem, and other supporting systems which comprise TS 110 may located at a different site from that of the antenna subsystem and transmitter of TS 110. For example, they may be located at a location which is a distance from them and linked with them through an optical fiber RF link system.

RS 130 in FIG. 1 is comprised of receiving antenna subsystems which are well known to those of ordinary skill in the art and is passive, i.e., unmanned, since no on-site supporting personnel is needed. RS 130 receives bistatic radar signals 140 which are reflections of radar signal 150 from target 160. After RS 130 receives bistatic radar signals 140, RS 130 sends these signals, referred to below as bistatic radar signals, over OFRLS 120 directly to TS 100 for processing.

Figure 2:
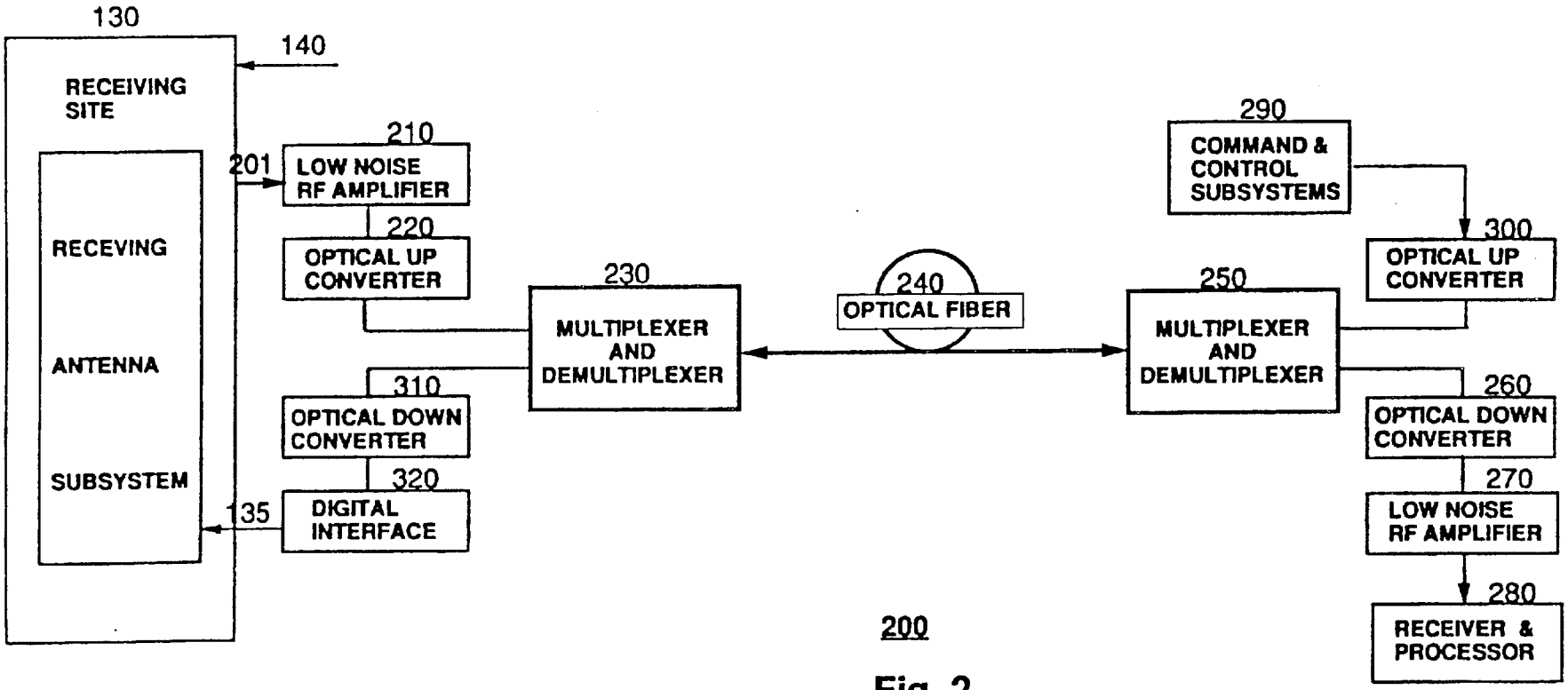
FIG. 2 shows a block diagram of an optical fiber RF link system for use in fabricating embodiments of the present invention.

FIG. 2 shows a block diagram of an optical fiber RF link system for use in fabricating embodiments of the present invention. As shown in FIG. 2, RS 130 receives bistatic radar signals 140 as input and outputs received bistatic radar signals 200. Then, received bistatic radar signals 200 are applied as input to low noise RF amplifier 210 to assure enough signal strength in order to overcome optical conversion losses. The output from RF amplifier 210 is applied as input to optical up-converter 220. Up-converter 220 converts the output from RF amplifier 210 into optical signals. The optical signals output from up-converter 220 are applied as input to multiplexer and demultiplexer 230. Multiplexer and demultiplexer 230 applies the optical signals as input to optical fiber 240 for transmission to multiplexer and demultiplexer 250 at TS 110. Multiplexer and demultiplexer 250 applies the optical signals as input to optical down-converter 260. Optical down-converter 260 converts the optical signals back to RF signals and applies the RF signals as input to low noise RF amplifier 270. RF amplifier 270 amplifies the RF signals and applies them as input to processor and receiver 280 for processing.

As further shown in FIG. 2, command and control signals which are used to slave RS 130 are sent from TS 110 to RS 130 in the following manner. Command and control signals are generated by command and control subsystems 290 and are applied as input to optical up-converter 300. Then, up-converter 300 converts the command and control signals into optical signals and applies the optical signals as input to multiplexer and demultiplexer 250. Multiplexer and demultiplexer 250 applies the optical signals as input to optical fiber 240 for transmission to multiplexer and demultiplexer 230 at RS 130. Multiplexer and demultiplexer 230 applies the optical signals as input to optical down-converter 310. Optical down-converter 310 converts the optical signals back to command and control signals and applies the command and control signals as input to digital interface 320. Lastly, digital interface 320 applies command and control to receiving antenna subsystem 135 in RS 130.

Low noise RF amplifier 210, optical up-converter 220, multiplexer and demultiplexer 230, optical fiber 240, multiplexer and demultiplexer 250, optical down-converter 260, low noise RF amplifier 270, optical up-converter 300, optical down-converter 310, and digital interface 320 are apparatus which are well known to those of ordinary skill in the art. For example: (a) optical up-converters typically comprise modulated laser sources and optical down-converters typically comprise photodetectors and (b) optical multiplexer and demultiplexer apparatus may comprise a spliced optical fiber, a hybrid of a grating and a dielectric thin-film filter, a planar wave guide, and so forth. In addition, processor and receiver 280 is apparatus which is well known to those or ordinary skill in the art.

Command and control subsystems 290 is apparatus which is well known to those of ordinary skill in the art and the manner in which command and control signals are generated thereby is also well known to those of ordinary skill in the art. Further, as is well known to those of ordinary skill in the art, the command and control signals typically take the form of digital signals. Still further, the manner in which the command and control signals are utilized to control receiving antenna subsystem 135 of RS 110 is well known to those of ordinary skill in the art.

As those of ordinary skill in the art will readily appreciate, embodiments other than the specific configuration shown in FIG. 2 may be fabricated to provide OFRLS 120. For example, the various converters may be combined with the multiplexer and demultiplexers by using multi-wavelength light sources and photodiodes; command and control signals may have own independent link system which is not optical fiber based. Further, as optical fiber in-line-amplifiers become available, one may be able to eliminate the use of low noise RF amplifiers.

In accordance with the present invention, it is advantageous to use an optical fiber to transmit the received bistatic RF signals between a receiving site and a transmitting site because of the low line loss of the optical fiber. For example, a commonly used single-mode fiber operating at a wave-length of 1300 nm, besides being light-weight and flexible, has an attenuation of less than 0.4 dB/km. In addition, commercially available laser sources and photodetectors make transmission of received bistatic radar signals feasible. For example, a 500 MHz bandwidth RF signal can now be transmitted in its entirety directly over optical links at any selected carrier frequency up to 16 GHz.

Figure 3:
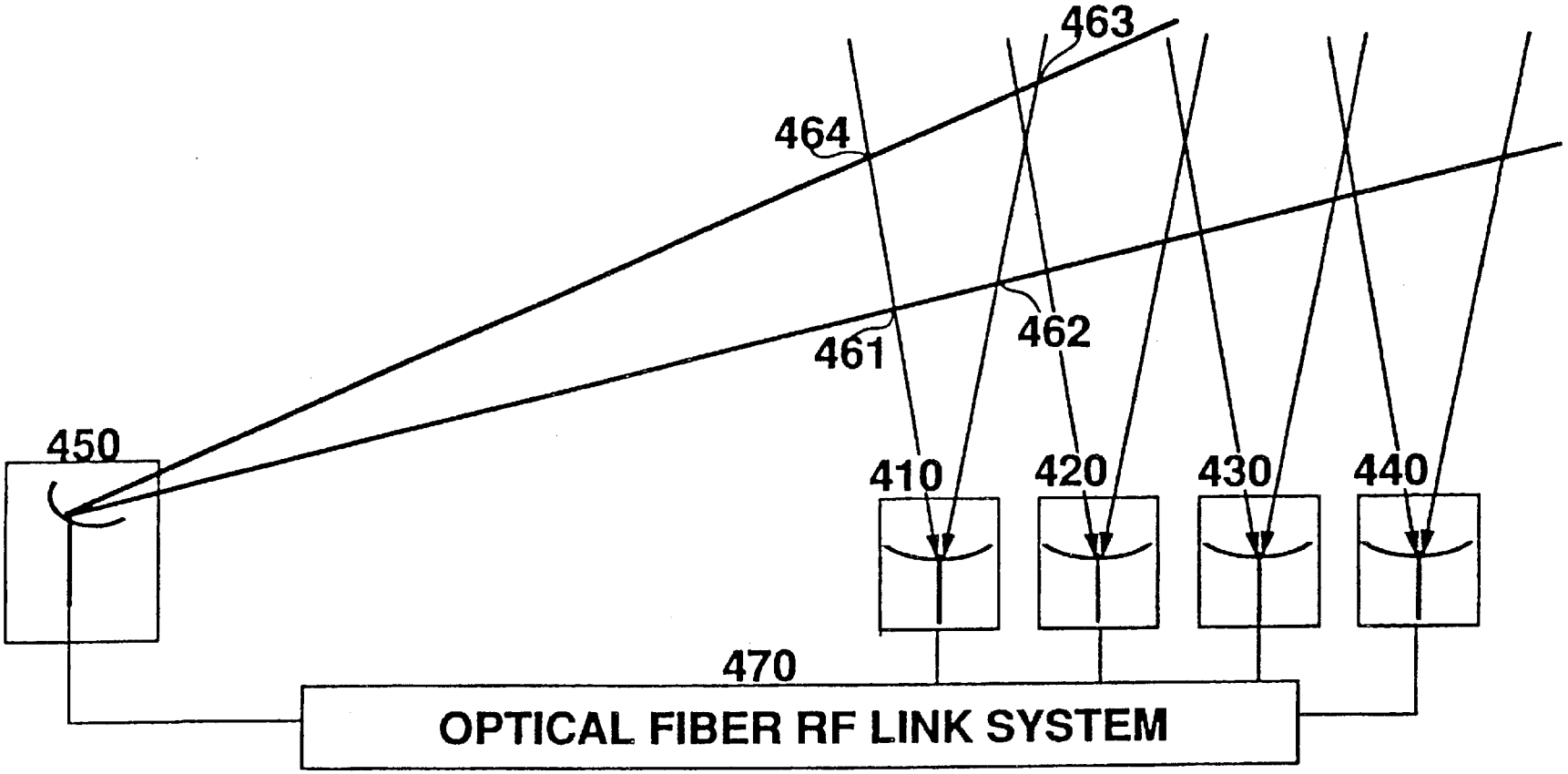
FIG. 3 shows a block diagram of an optical fiber based bistatic radar fabricated in accordance with the present invention which provides volumetric coverage.

FIG. 3 shows a block diagram of an optical fiber based bistatic radar fabricated in accordance with the present invention which overcomes a limitation of bistatic radars systems which is referred to in the art as volumetric coverage. This limitation occurs because, as is well known in the art, a bistatic receiving antenna only observes a limited portion of the spatial volume illuminated by a radiated beam from a transmitting site. A commonly accepted approach in the art for solving the problem caused by this limitation is "pulse chasing". However, it is well known that mechanical pulse chasing is impossible because it is too slow. In addition, while electrical pulse chasing by beam steering a phase-array antenna is theoretically possible, but in practice it is difficult to accomplish.

In accordance with the present invention, bistatic radar system 400 shown in FIG. 3 provides volumetric coverage by advantageously providing a multiplicity of receiving sites 410–440. Because the cost of adding an optical fiber linked bistatic receiving site to the system is relatively low, the use of many receiving sites will not prohibit obtaining coverage of a reasonable number of surveillance sectors of the beam radiated from the transmitting site 450. Thus, as many receiving sites can be added to the system as are needed to cover the illuminated volume of a transmitting antenna. Receiving sites 410–440 are operated in a passive mode and, as shown in FIG. 3, each site captures a particular sector of the illuminated volume, for example, RS 410 captures the volume within points 461–464.

In operation, radar signals returned from the different sectors are time ordered sequentially and, in a preferred embodiment of the present invention, received bistatic radar signals from the different receiving sites (RS 410–440) are time-multiplexed over OFRLS 470 and transmitted to a common receiver and processor at TS 450. In further embodiments of the present invention, antennas at different receiving sites may operate independently or may operate in subgroups to track particular targets in the surveillance volume of the transmitting antenna. This is advantageous because the position and velocity of a designated target will be well defined when several receiving antennas track it and, at the same time, jamming, fluctuation, and ground interference will be minimized.

In still further embodiments of the present invention, radar signals from different transmitting and receiving sites are coherently processed and correlated and, as a result, the baseline length for achieving an accurate measurement is reduced. For example, determination of a velocity component using a coherent Doppler shift difference measurement requires less baseline separation than that which is determined using an incoherent differential Doppler measurement. In addition, grouping the received bistatic radar signals from several receiving sites will increase the system's resolving power in distinguishing clustered targets. Advantageously, system 400 is less complex than the prior art method of beam steering a phase-array antenna, which prior art method requires an active electronic beam steering network to synchronize the transmitting and receiving of radiation in RF pulse chasing.

In still further embodiments of the present invention, initial radar pulses are split. Parts of split pulse are transmitted and parts are delayed through optical fiber RF link systems. As is well known to those of ordinary skill in the art, making interference of the delayed pulses with received radar pulses creates intrapulse coherent measurements. As a result, the Doppler shift caused by a target motion can be monostatically measured without imposed restrictions on whether the initially transmitted radar radiation is continuous or inter pulse coherent.

Figure 4:
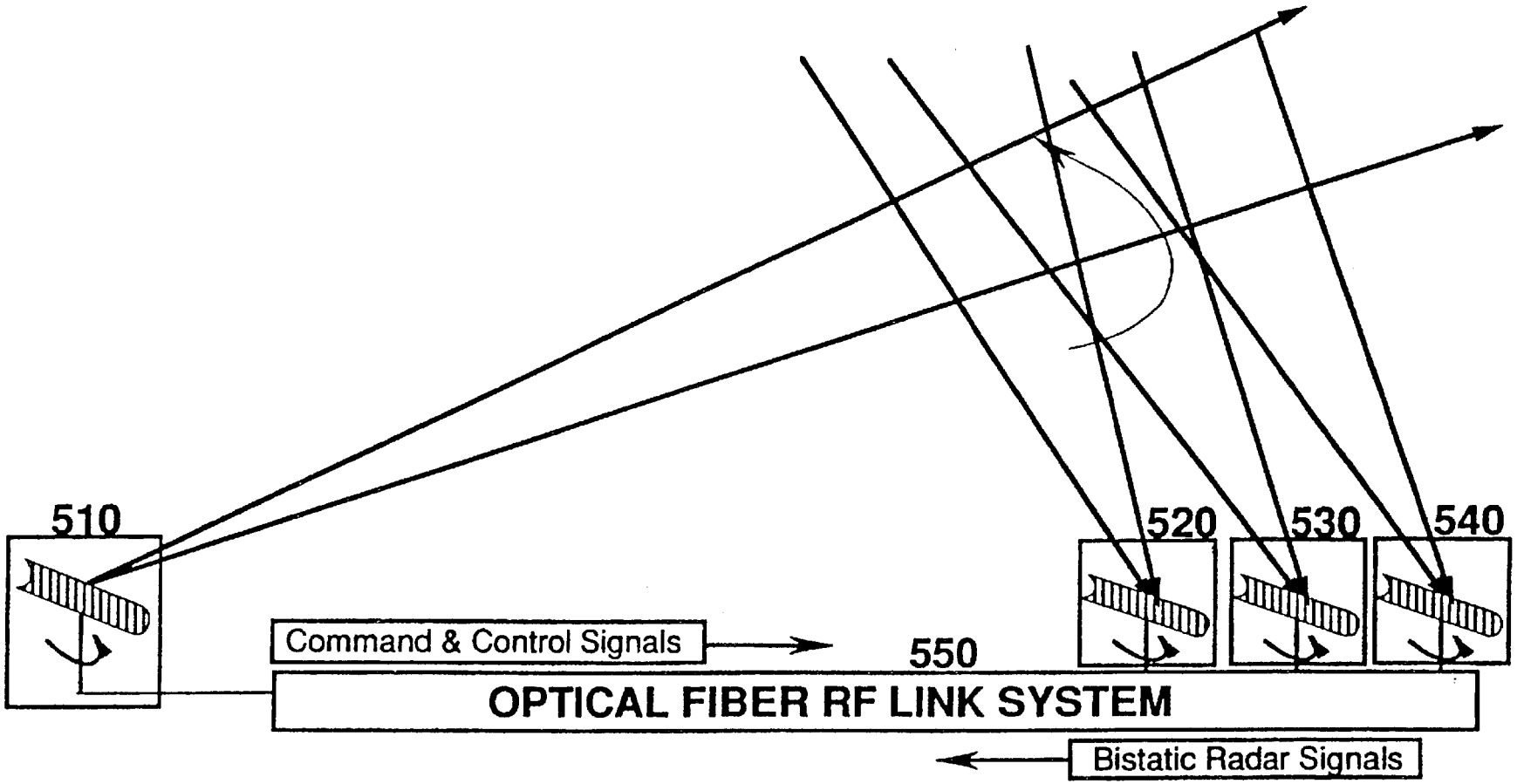
FIG. 4 shows a block diagram of an optical fiber based bistatic radar fabricated in accordance with the present invention which provides synchronization among transmitting and receiving sites.

FIG. 4 shows a block diagram of optical fiber based bistatic radar 500 fabricated in accordance with the present invention which provides synchronization among transmitting site 510 and receiving sites 520–540 during scan and search operations.

In accordance with the present invention, OFRLS 550 sends bistatic radar signals as well as digital command and control signals. Receiving antennas which comprise RS 520–540 operate in a slave mode under the command and control of TS 510. Thus, whenever the transmitting antenna in TS 510 scans and searches, TS 510 sends command and control signals to the receiving antennas in RS 520–540 to cause them to receive bistatic radar signals from predetermined beam pointing positions. Then, received bistatic radar signals from RS 520–540 are sent to TS 510 over OFRLS 550 for processing at TS 510. In accordance with methods which are well known to those of ordinary skill in the art, the receiver and processor in TS 510 can determine whether any one or more of RS 520–540 is erroneously pointing. In response to the detection of an error, TS 510 will generate an appropriate command and control signal to cause the error or errors in pointing to be corrected. Thus, system 500 provides a direct analog feedback.

Bistatic radar system 500 provides an advantage over a monostatic radar system in that a bistatic radar cross section is many times larger than a monostatic cross section when a target is in a direct line substantially between transmitting and receiving antennas. The fact helps the detection of a low observable since such detection requires a long separation between these two antennas. As the separation increases, the bistatic coverage volume decreases and synchronization becomes difficult. However, analog feedback derived from the received bistatic radar signals can be used to assure proper synchronization during scanning and tracking operations. Further, many known monostatic radar processing techniques may be utilized to reduce contamination from clutter returns in the case of very small bistatic return since there is no difference between monostatic and optical fiber based bistatic radar processing.

Figure 5:
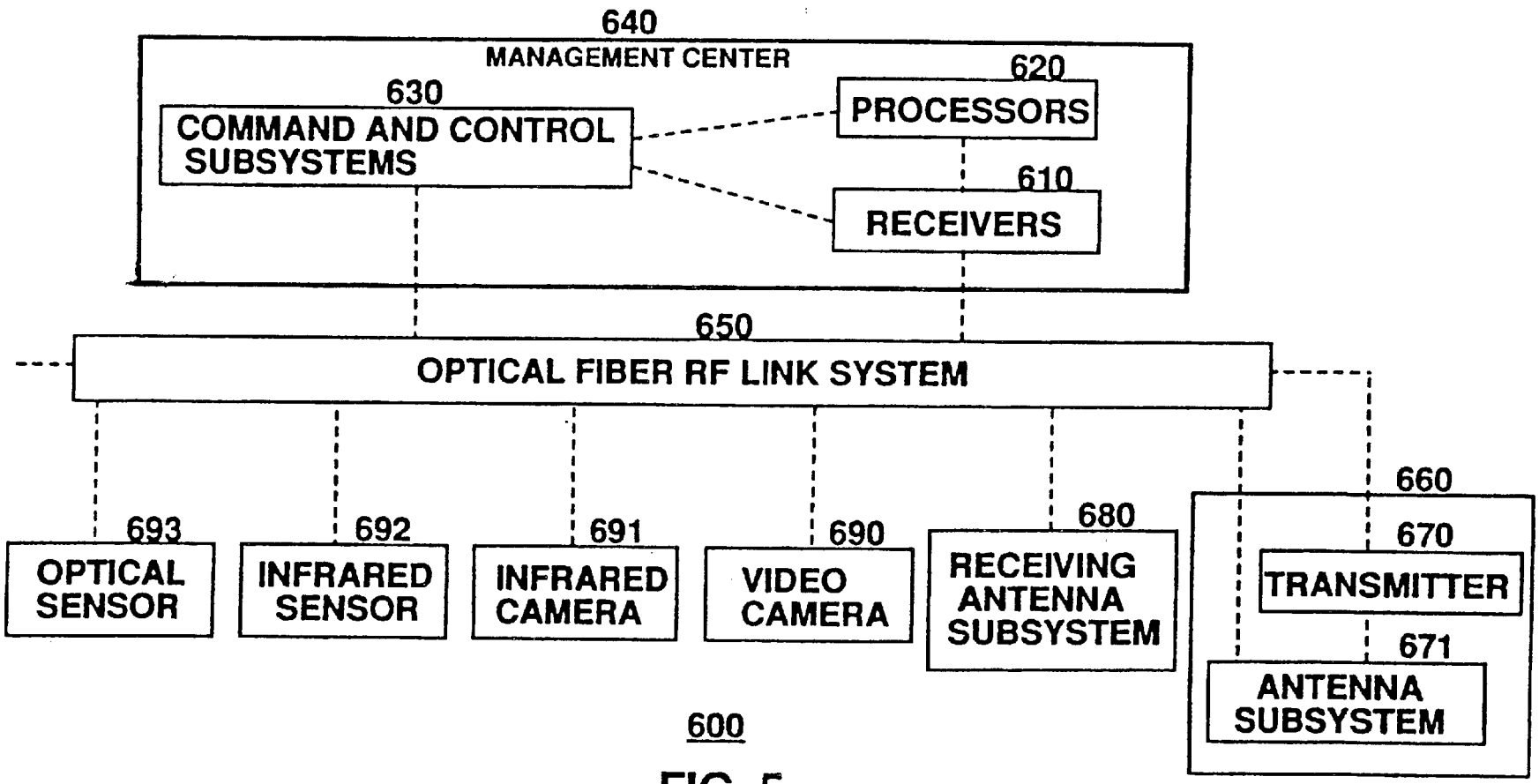
FIG. 5 shows a block diagram of a bistatic RF network which is fabricated in accordance with the present invention.

FIG. 5 shows a block diagram of embodiment 600 of bistatic RF network which is fabricated in accordance with the present invention. Optical fiber based bistatic radars, optical and infrared sensors, video and infrared cameras are merged together to form a complex network. The detailed architecture of a bistatic RF network varies with the needs. The main function of a bistatic RF network is on bistatic radar detections and measurements for achieving various objectives of operation and management. Antennas, sensors and cameras need not be at fixed locations, and may be on the optical fiber tethered vehicles.

As shown in FIG. 5, receivers 610, processors 620, command and control subsystems 630, are housed in a management center 640 for an effective utilization of resources and purpose of reducing operation costs. For a purpose of illustration, the bistatic RF network 600 is being used for airport operation and management. In accordance with the present invention OFRLS 650 sends command and control signals from command and control subsystem 630 to a transmitting site 660, then the transmitter 670 is activated and the antenna subsystem 671 scans and surveys the airport. The received monostatic radar signal from the antenna subsystem 671 is sent through OFRLS 650 to receivers 610 and processors 620 for processing. Receiving sites 680 are strategically located around the airport. The receiving antenna subsystem of each receiving site receives bistatic radar signals from its coverage area and these signals are also sent through OFRLS 650 to receivers 610 and processors 620 for processing. In accordance with methods which are well known to those of ordinary skill in art, receivers and processors determine the position, speed, and heading of each aircraft and vehicle on the airport ground, the landing safety of approaching aircraft, stopping and skidding distance of landed aircraft, and weather turbulence on landing. Command and control subsystems 630 then process these information for achieving objectives of the airport activity management. Each receiving site may be equipped with video cameras 690 for visual identification of aircraft and vehicles in its surveillance area. Video signals are sent through OFRLS 650 to the center 640 for display. In a preferred embodiment of the present invention, each receiving site may be equipped with infrared cameras 691 and infrared sensors 692 for aided visual identification during poor weather as well as for measuring surface and exhaust temperatures of aircraft to determine aircraft states in operation: landed, prepared to take off, and ice loading. Each receiving site may also be equipped with optical sensors 693 to determine ground temperature, local wind and surface conditions. Infrared cameras 691, infrared sensors 692, and optical sensors 693 all send their collected signals through OFRLS 650 to the center 640.

Figure 6:
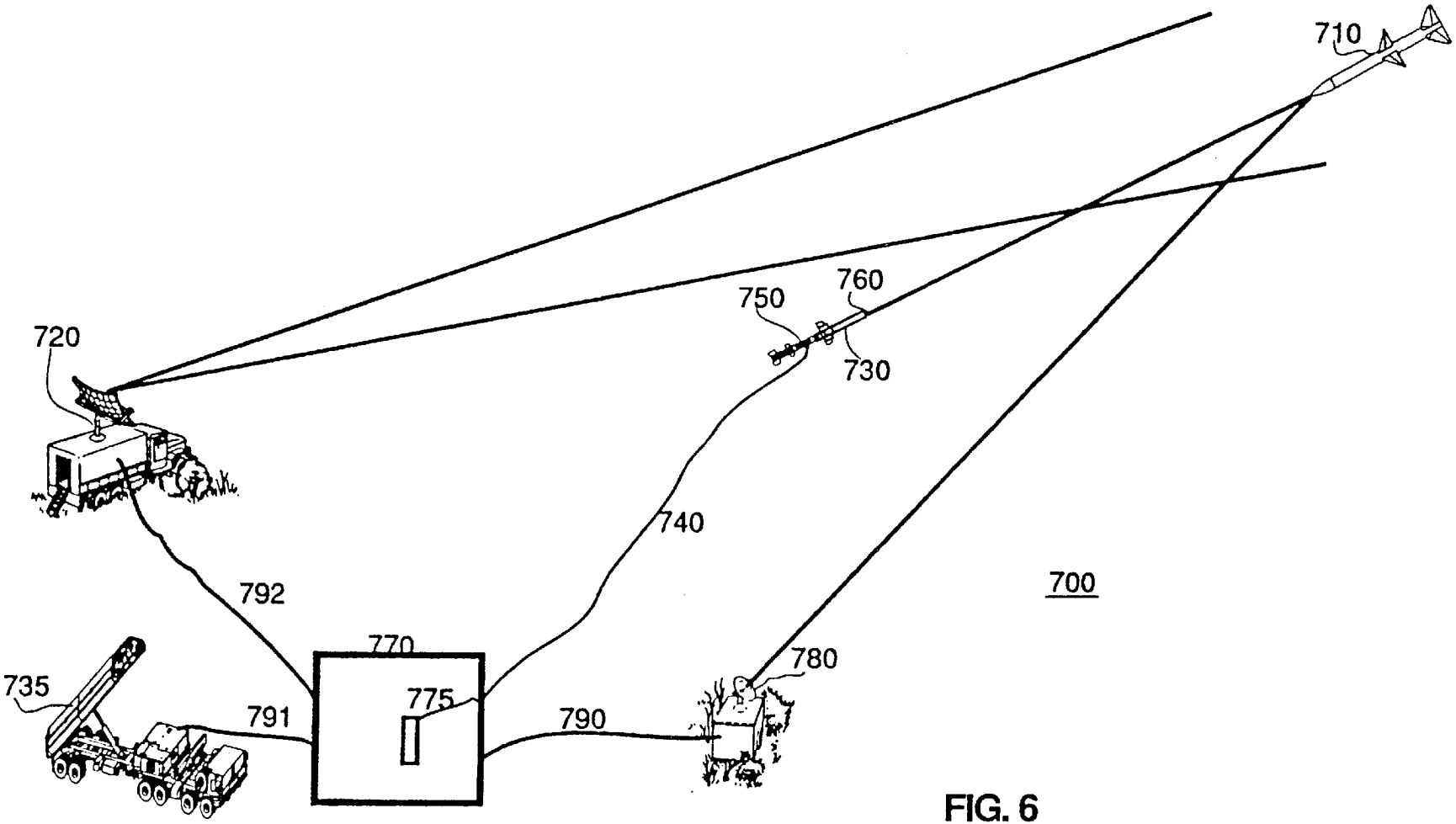
FIG. 6 shows a pictorial representation of a tethered optical fiber bistatic radar system which is fabricated in accordance with the present invention.

FIG. 6 shows a pictorial representation of tethered optical fiber bistatic radar system 700 which is fabricated in accordance with the present invention. In a tethered optical fiber bistatic radar, an optical fiber RF link system is spooled onto spools at both ends. When such a system is deployed, the spools play out the optical fiber. Such tethered optical fiber bistatic radars enable many sophisticated electronic warfare applications. For example, from a transmitting site or platform, one may send a vehicle carrying RF receiving antenna subsystems which are tethered to optical fibers into an the area of concern. The vehicle may be a decoy, an unmanned vehicle ("UAV"), a bomb, a missile, or a hybrid with both hard and soft kill capabilities. A close surveillance of enemy territory becomes possible while a tethered bistatic receiving UAV in a covert mode of operation. The antenna subsystem of the UAV will collect RF radiations which are reflected from a target illuminated by the transmitting platform, which transmitting platform stays outside of the lethal range of the target. In addition, such a tethered optical fiber bistatic radar may be used to guide a tethered missile or bomb to neutralize targets. The tethered missile or bomb is low in cost, easy to develop, agile, robust, generic, smart, weather independent, and evolves with technology, since major electronic systems are on the transmitting site or platform. A tethered decoy or hybrid under the guidance of bistatic radar will be able to assess constantly its success, for example, in deterring hostile missile threat through Doppler shift difference measurements. As those of ordinary skill in the art will readily appreciate, a tethered optical fiber bistatic radar is different from a prior art tethered optical fiber data link which only transmits video and digital signals.

As shown in FIG. 6, tethered bistatic radar system 700 is being used in an antimissile operation. Incoming missile 710 is illuminated by ground transmitting site 720. Antimissile missile 730 launched from missile launcher 735 is tethered to optical fiber RF link system 740 by spool 750 on missile 730 and spool 775 on command and control site 770. Antimissile missile 730 carries RF antenna 760 for bistatic receiving. Well known electronic systems and processors are located on command and control site 770 to achieve sophisticated missile tracking and guidance. In accordance with the present invention, a constant assessment of the success of antimissile missile 730 is determined by a Doppler shift difference measurement through processors at command and control site 770. In a preferred embodiment of the present invention, additional receiving sites 780 are deployed for better determination of the position and velocity components of incoming missile 710. Ground transmitting site 720, launcher 735, and receiving sites are all connected to command and control site 770 through optical fiber RF link systems 790–792.

ADVANTAGES AND OBJECTIVES

Embodiments of the present invention are advantageous because spatial separation between transmitting and receiving antennas in a bistatic mode of operation increases isolation between antennas which in turn reduces contamination of received signals by transmitted signals. In addition, the use of optical fiber RF link systems makes bistatic radars accessible to reduce electromagnetic interference and, thereby, to provide better sensitivity than that of monostatic radars. In further addition, embodiments of the present invention enable bistatic receiving signals to be processed in the same fashion as monostatic receiving signals and, as a result, bistatic signal processing will have a sophistication which is similar to that of monostatic signal processing.

Embodiments of the present invention will provide better determination of target position, velocity, and characteristics than are made by monostatic radar systems because embodiments of the present invention provide triangulation in position determination and more components for use in Doppler shift analysis. Many well known correlation methods in scattering theories, with the help of optical fiber RF link systems, can be deployed to process radar signals in investigating target characteristics. For example, mutual and self correlations among transmitted and received radar signals from a same site and different sites can be performed by using optical fiber RF link systems as delay lines.

Embodiments of the present invention provide inexpensive bistatic receiving sites because the bistatic receiving sites are comprised only of receiving antenna subsystems. As a result, it will be advantageous to fabricate bistatic radar systems which are comprised of a large number of bistatic receiving sites. In fact, it is within the spirit of the present invention to have a bistatic radar RF network which comprised of a network of optical fiber based bistatic radars, optical sensors, infrared sensors, and video cameras connected together by optical fiber RF link systems. The network has a command and control center, where receivers, processors, command and control subsystems are located. In such a network, analog radar signals from bistatic receiving sites are directly fed to the bistatic RF network, and are timely available to the command and control center without processing delay. As those of ordinary skill in the art can readily appreciate, centralized processing leads to a better utilization of resources and yields more comprehensive information. Such a bistatic RF network which is comprised of many receiving antenna subsystems may advantageously be installed in and around an airport to obtain information relating to ground and air traffic to enhance air traffic safety. In addition, bistatic RF networks can be utilized to monitor ship movement in a harbor, to manage highway traffic control, to gather weather data, to manage wildlife, to manage a battlefield, and to deter low observables.

Bistatic RF networks which are fabricated in accordance with the present invention enable one to obtain concurrent RF testing. Many different types of optical fiber based transmitting and receiving sites are deployed in a concurrent testing to generate and receive various forms of RF signals. Concurrent returns from many objects and environment are can be analyzed with either a transmitted or a received radar signal as reference. In such a mode, a bistatic RF network can collect instantaneous variations and transient characteristics of sea states, weather changes, and their effects on radar targets. In addition multifunctional transmitters and receivers are deployed to mimic a large number of signal function transmitters and receivers for optimally achieving functional and spatial diversity in a concurrent testing.

Bistatic RF networks which are fabricated in accordance with the present invention enable one further to obtain live electronic warfare simulation. Electronic support measure and countermeasure systems are radars, jammers, passive receivers. During an operation, electromagnetic interference among these systems, and deliberate jamming from hostile platforms force these systems becoming passive bistatic radars in transmitting and receiving bistatic radar signals. Bistatic RF networks with multifunctional radar transmitters operating in agile modes and their signals modulating according to various electronic support measure and countermeasure systems, and with multifunctional receivers processing received RF signals in a same way as the processors of these electronic systems are able to mimic the realistic operation of these electronic systems. Such a live war simulation would be more realistic than many present war simulators, and more generic and agile than mock up test ranges.

Embodiments of the present invention can provide coherent connection among receiving sites. This is accomplished by compensating for RF phase variations which are induced by topological irregularities. Such compensation is achieved by adjusting the length of optical fiber RF link systems. In addition, receiving sites can coherently act together to form an RF interferometer without being restricted by aircraft, ship, or land profiles.

SUMMARY, RAMIFICATIONS, AND SCOPE

Those skilled in the art recognize that further embodiments of the present invention may be made without departing from its teachings. For example, the optical fiber based bistatic radars can have many designs as well as different variations. The transmitting antenna and transmitter may not be collocated with receiving, processing, command and control subsystems. Secondary transmitting subsystems may be added to various sites to enhance the transmission diversity of the bistatic RF network. Signals from different transmitting sites may radiate coherently at the commands of the main control center, and the returned signals from different receiving sites may be coherently processed. The coherent spatial diversity of the ground based bistatic radar will expand the radar capabilities whether in the target determinations or in the electronic warfare applications. An optical fiber based bistatic RF network may couple with the conventional digital and analogy communication network to form a complex network. Thus, the scope of the invention should be determined by appended claims and their legal equivalent, rather than by the examples given.

What is claimed is:

1. A bistatic radar system comprising:

a transmitting radar site;

a receiving radar site;

an optical fiber RF link system linking the transmitting radar site and receiving radar site; wherein the transmitting radar site comprises means for transmitting RF signals; wherein the receiving radar site comprises means for receiving reflections of the RF signals; and wherein the optical fiber RF link system comprises: (a) means for receiving a portion of the reflected RF signals from the receiving radar site; (b) means for up-converting the portion of the reflected RF signals to an optical signal; (c) means for sending the optical signal from one end to a second end; (d) means for down-converting the optical signal at second end to a RF signal; and (e) means for sending the received portion RF signal to the transmitting radar site.

2. The bistatic radar system of claim 1 wherein said transmitting radar site further comprises means for processing bistatic RF signals using monostatic radar processing means.

3. The bistatic radar system of claim 1 wherein said transmitting radar site comprises means for generating command and control signals; wherein the optical fiber RF link system further comprises means for receiving the command and control signals from the transmitting radar site and for sending them to the receiving radar site; and wherein the receiving radar site further comprises means responsive to the command and control signals for controlling operation of the means for receiving bistatic RF signals.

4. The bistatic radar system of claim 1 wherein the means for generating command and control signals comprise means for generating a command and control signals which includes the target location, and means for sending them to the receiving radar sites; wherein the receiving radar site further comprises means for searching and selecting a target of interest according to the command and control signals, and means for sending the received reflections of the transmitted RF signals back to the transmitting radar site; wherein the transmitting radar site further comprises means for processing the reflected RF signals generated in response to the command and control signals specifying target location, and means for determining errors in the location; wherein the transmitting radar site further comprises means in determining a new target location, and means in applying the new target location as input to the command and control signal generating means.

5. The bistatic radar system of claim 2 wherein said transmitting radar site further comprises means for detecting a portion of the reflected RF signals; and wherein the monostatic radar processing means further comprises means for using the portion of the reflected RF signals as a reference; wherein said means for detecting a portion of the reflected RF signals comprises an antenna for receiving reflected RF signals at the transmitting radar site.

6. The bistatic radar system of claim 2 wherein said means for transmitting RF signals comprises an antenna and wherein the means for detecting a portion of the RF signals comprises means for detecting the portion prior to the RF signals being applied to the antenna; and wherein the monostatic radar processing means further comprises means for using the portion of the detected RF signals as a reference.

7. The bistatic radar system of claim 6 wherein the transmitting radar site further comprises means for delaying detected RF signals; and wherein the monostatic radar processing means further comprises means for using the portion of the delayed RF signals as a reference.

8. The bistatic radar system of claim 1 wherein the receiving radar site is affixed to a movable means[and the optical fiber RF link system comprises a spooled fiber system; wherein the fiber system comprises a spool at one end which is affixed to the movable means, and a second spool at second end which is affixed to the transmitting radar site].

9. The bistatic radar system of claim 8 wherein the transmitting radar site is affixed to a movable means[and the optical fiber RF link system comprises a spooled fiber system; wherein the fiber system comprises a spool at one end which is affixed to the receiving radar site, and a second spool at second end which is affixed to the transmitting radar site].

10. The bistatic radar system of claim 2 wherein said means for processing the RF signals further comprises means for correlating different portions of the RF signals from the transmitting and receiving radar sites.

11. A method for operating bistatic radar system comprising steps of:

(a) transmitting RF signals from a transmitting radar site and receiving reflections of the RF signals at a receiving radar site, (b) up-converting a portion of the reflected RF signals to optical signals, (c) sending the optical signals from one end of an optical fiber to the other, (d) down-converting the optical signals to RF signals at the transmitting radar site.

12. The method of claim 11 further comprising the step of processing bistatic RF signals using monostatic radar processing methods.

13. The method of claim 11 further comprising steps of:

(e) receiving reflections of the RF signals at the transmitting radar site;

(f) sending both reflected RF signals from receiving and transmitting radar sites to a receiver;

(g) processing the reflected RF signals from the receiving radar site by using the reflected RF signals from the transmitting radar site as a reference.

14. The method of claim 11 further comprising steps of:

(e) detecting a portion of RF signals prior to the transmission of RF signals;

(f) delaying the detected RF signals;

(g) sending both reflected RF signals and the delayed RF signals to a receiver;

(h) processing the reflected RF signals by using the delayed RF signals as a reference.

15. The method of claim 11 further comprising steps of:

(e) searching and selecting a target of interest at a transmitting radar site using monostatic radar methods;

(f) determining a location of the target using monostatic radar methods;

(g) generating a command and control order;

(h) and sending the order to a receiving radar site over an optical fiber RF link system;

(i) pointing an antenna subsystem at the receiving radar site at said target in response to said control signal;

(j) generating RF signals at the transmitting radar site and receiving reflected RF signals at the receiving radar site;

(k) sending said reflected RF signals to the transmitting radar site through the optical fiber RF link system;

(l) processing said reflected RF signals at the transmitting radar site;

(m) determining a new target location and target location error;

(n) going back to step (g) unless the target location error is less than a predetermined amount.

16. [An] *A* radar network comprising:

[a management center which is comprised of:

(a) command and control means for generating command and control signals and for applying them to an optical fiber RF link system; and (b) processing means for receiving and analyzing RF signals applied thereto from the optical fiber RF link system; one or more transmitter sites, each of which comprises means:

(c) for receiving command and control signals from the optical fiber RF link system; and, in response, (d) for transmitting RF signals;

(e) for applying a portion of transmitted RF signals as input to the optical fiber RF link system;

(f) for receiving reflections of RF signals transmitted by at least one of the one or more transmitting sites; and (g) for applying the received RF signals as inputs to the optical fiber RF link system; one or more receiving radar sites, each of which comprises means:

(h) for receiving command and control signals from the optical fiber RF link system;

(i) for receiving reflections of RF signals transmitted by at least one of the one or more transmitting sites; and (j) for applying the received RF signals as inputs to the optical fiber RF link system;

wherein the optical fiber RF link system comprises means;

(k) for receiving RF signals applied thereto from a transmitting site or from a receiving site;

(l) for up-converting the RF signals to optical signals;

(m) for sending the optical signals along the fiber system;

(n) for down-converting the optical signals back to RF signals; and (o) for applying the transferred RF signals as inputs to the processing means]

*a management center;*

*one or more transmitter sites;*

*one or more receiving sites; and*

*an optical fiber RF link system linking at least one of the transmitter or receiving sites to the management center; wherein the transmitter sites comprise means for transmitting RF signals; wherein the receiving sites comprise means for receiving reflections of the RF signals; wherein the optical fiber RF link system comprises means for transiting RF signals between the management center and its linked sites; wherein the management center comprises means for commanding and controlling the transmitter and receiving sites, and comprises further means for processing the RF signals.*

17. The radar network of claims 16 which further comprises one or more means for receiving audio, video, infrared, [and] *or* optical signals; wherein the optical fiber RF link system further comprises means for transferring and applying the signals to the processing means; wherein the processing means further comprise *one or more* means for processing audio, video, infrared, [and] *or* optical signals.

[18. The radar network of claim 16 wherein said one or more radar receiving sites are affixed to movable means and the optical fiber RF link system further comprises spooled fiber systems; wherein each of the spooled fiber systems comprises a spool at one end which is affixed to one of the movable means, and a second spool at second end which is affixed to the management center.]

[19. The radar network of claim 16 wherein said one or more transmitter sites are affixed to movable means and the optical fiber RF link system further comprises spooled fiber systems; wherein each of the spooled fiber systems comprises a spool at one end which is affixed to one of the movable means, and a second spool at second end which is affixed to the management center.]

20. The radar network of claim 16 which further comprises means for neutralizing objects of interest; wherein the management center further comprises means for generating commands to control the means in neutralizing objects of interest.

*21. A method for operating a radar network comprising steps of:*

(*a*) *linking at least one or more transmitter sites to a management center through an optical fiber RF link system;*

(*b*) *transiting RF signals between the linked transmitter sites and the management center through the optical fiber RF link system;*

(*c*) *transmitting RF signals from the transmitter sites;*

(*d*) *receiving and sending reflected RF signals to the management center; and*

(*e*) *processing the reflected RF signals with a reference to the transmitted RF signals.*

*22. A radar system comprising:*

*one or more radar sites;*

*one or more optical fiber RF link systems;*

*wherein the optical fiber RF link systems comprise means for delaying RF signals from the one or more radar sites.*

*23. The radar system of claim 22 further comprises means for processing RF signals from the same or different radar sites with a reference to the delayed RF signals.*

*24. A method for operating multiple transmitting or receiving sites comprising steps of:*

(*a*) *linking the sites with a processing center through optical fiber RF link systems;*

(*b*) *adjusting one or more delays of the optical fiber RF link systems;*

(*c*) *transmitting or receiving RF signals from the sites;*

(*d*) *transiting the RF signals between the sites and the processing center through the optical fiber RF link systems;*

(*e*) *generating or processing RF signals at the processing center.*

* * * * *